United States Patent [19]
Pearce

[11] Patent Number: 5,657,445
[45] Date of Patent: Aug. 12, 1997

[54] APPARATUS AND METHOD FOR LIMITING ACCESS TO MASS STORAGE DEVICES IN A COMPUTER SYSTEM

[75] Inventor: John J. Pearce, DelValle, Tex.

[73] Assignee: Dell USA, L.P., Round Rock, Tex.

[21] Appl. No.: 592,044

[22] Filed: Jan. 26, 1996

[51] Int. Cl.$^6$ .................................................. G06F 12/14
[52] U.S. Cl. .......................... 395/186; 395/490; 395/857; 395/591
[58] Field of Search ................................. 395/186, 427, 395/481, 490, 821, 856, 857, 561, 580, 591

[56] References Cited

U.S. PATENT DOCUMENTS

| | | | |
|---|---|---|---|
| 4,821,169 | 4/1989 | Sites et al. | 395/416 |
| 4,868,738 | 9/1989 | Kish et al. | 395/846 |
| 4,926,322 | 5/1990 | Stimac et al. | |
| 4,961,161 | 10/1990 | Kojima | 364/736.5 |
| 4,991,083 | 2/1991 | Aoyama et al. | 395/417 |
| 5,056,009 | 10/1991 | Mizuta | 395/490 |
| 5,257,353 | 10/1993 | Lenaro | 395/856 |
| 5,483,649 | 1/1996 | Kuznetsov et al. | 395/186 |
| 5,522,075 | 5/1996 | Robinson et al. | 395/406 |

*Primary Examiner*—Robert W. Beausoliel, Jr.
*Assistant Examiner*—Ly V. Hua
*Attorney, Agent, or Firm*—Mark P. Kahler; Henry N. Garrana; Diana L. Roberts

[57] ABSTRACT

A computer system is provided with the capability of protecting portions of the mass storage media therein from unauthorized access. The mechanism employed to protect portions of the mass storage media is advantageously operating system independent. Thus, the protection mechanism functions regardless of what operating system is installed or what particular application software is presently being executed. More particularly, the computer system includes a processor configured to execute code in an operational mode and in a system management mode. A mass storage device and a memory are coupled to the processor. At least one region of the mass storage device is designated as a protected region by the user or by the manufacturer. The computer system is configured to trap mass storage device I/O operations and, in response to a trapped mass storage device I/O operation, the processor enters a system management mode. The computer system is configured to prevent execution of the trapped mass storage device I/O operation if the trapped mass storage device I/O operation is directed to a protected region of the mass storage device. However, the computer executes the trapped mass storage device I/O operation if the trapped mass storage device I/O operation is not directed to a protected region of the mass storage device. In this manner, increased computer system security is provided to selected portions of the mass storage device without reliance on protective mechanisms within the operating system or within add-on application software.

24 Claims, 4 Drawing Sheets

APPARATUS AND METHOD FOR LIMITING ACCESS TO MASS STORAGE DEVICES IN A COMPUTER SYSTEM

BACKGROUND OF THE INVENTION

1. Field of the Invention

This invention relates in general to computer systems and, more particularly, to apparatus and methodology for preventing undesired access to personal computer systems.

2. Description of Related Art

Personal computer systems in general and IBM compatible personal computer systems in particular have attained widespread use. These personal computer systems now provide computing power to many segments of today's modem society. A personal computer system can usually be defined as a desktop, floor-standing, or portable microcomputer that includes a system unit having a system processor with associated volatile and non-volatile memory, a display monitor, a keyboard, one or more floppy diskette drives, a mass storage device such as a hard disk, and an optional printer. One of the distinguishing characteristics of these systems is the use of a system board or motherboard to electrically connect these components together. These personal computer systems are information handling systems which are designed primarily to give independent computing power to a single user (or a relatively small group of users in the case of personal computers which serve as server systems). Such personal computer systems are generally inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives are also considered to be peripheral I/O devices.

Personal computer systems typically include basic input/output system (BIOS) microcode to make programmer/user interaction with the system hardware easier. More specifically, BIOS is a microcode software interface between the system hardware and the operating system/application program. The operating system and application program access BIOS rather than directly manipulating I/O ports, registers and control words of the specific system hardware. BIOS is accessed through an interface of software interrupts and contains a plurality of entry points corresponding respectively to the different interrupts. In operation, BIOS is typically loaded from a BIOS ROM in which it is stored into a main system memory from which it is executed. This practice is referred to as "shadow RAM" and increases the perceived speed at which BIOS executes.

It is often desirable to limit access to certain portions of mass storage devices such as the hard disk drive of the computer system. Virus writers are known to write programs which write over critical areas of the computer's main mass storage device or disk drive. Such virus programs can cause the computer to malfunction. FIG. 1 shows the layout of a typical hard disk drive 10 which is subject to such tampering. Although hard drive 10 is divided into cylinders and sectors according to well known convention, drive 10 is represented linearly in FIG. 1 as including a master boot record 15, a boot record 20 for a native operating system, a file allocation table (FAT) 25, a root directory 30 and customer data 35 which includes applications and corresponding data. A first partition 40 is formed by the contents of boot record 20, file allocation table 25, root directory 30 and customer data 35. An optional second partition is shown as second partition 45. Second partition 45 can include an alternative operating system, applications and data. Master boot record 15 and boot record 20 are critical to the proper startup and correct operation of the computer system. Unfortunately, it is a well known practice of virus writers to write virus code which attacks and overwrites these critical areas of drive 10. The purpose of such an attack is generally to damage or obtain control of the computer system. Accordingly, it is desirable that these critical areas of the storage device or drive be protected from such malicious access.

One conventional way to protect these critical areas of the disk drive from undesired access is employed in the OS/2® Warp operating system product manufactured by the International Business Machines Corporation. That operating system will not grant the right to an application program to write to critical areas of the disk drive such as the master boot record. Unfortunately, this protection mechanism relies on the operating system. Thus, if the OS/2 Warp operating system is stored in first partition 40 and an alternative operating system such as the AIX operating system (AIX is a trademark of the International Business Machines Corporation) is stored in the second partition 45, then the protection mechanism is available only when the operating system in the first partition is active. Such protection would not necessarily be available when the operating system installed in the second partition is active unless that operating system were specifically written with protective features similar to the OS/2 Warp operating system installed on the first partition. In this scenario, the protection mechanism is said to be "operating system dependent" because it depends on the operating system for its existence and functionality.

An alternative conventional approach to protecting critical areas of the disk drive is seen in the Microsoft Anti-Virus application program. This program is an application/driver which traps and prevents a virus program from writing to a critical area of the disk drive. Another alternative conventional approach to protecting critical areas of the disk drive is a terminate and stay resident (TSR) program which traps and prevents writes to such regions of the disk. Unfortunately, the three above discussed conventional approaches are all "operating system dependent". They are all subject to a user inadvertently or intentionally booting from a floppy disk left in the floppy disk drive of the computer system. In this case, the protection provided by the operating system, or alternatively the driver or the TSR, would be avoided. The critical areas of the hard disk of the computer system would thus be left vulnerable to penetration and attack by a virus program.

SUMMARY OF THE INVENTION

A computer system with an improved capability of protecting portions of the mass storage media from unauthorized access was discovered. The mechanism employed to protect portions of the mass storage media is advantageously operating system independent. Thus, this protection mechanism functions regardless of which particular operating system is installed or which particular application software is presently being executed.

More particularly, one embodiment of the computer system is disclosed which includes a mass storage device for storing information. The mass storage device includes a region which is designated as a region to be protected, namely a protected region. The computer system also includes a processor which is coupled to the mass storage device. The processor is configured to execute code in an operational mode and in a system management mode (SMM). The processor is configured to enter the system management mode when an I/O instruction is encountered which is directed to the mass storage device. The computer system further includes a memory which is coupled to the processor. The memory stores SMM code which when executed by the processor upon entering system management mode causes the processor to prevent a write I/O instruction from writing to the protected region when the write I/O instruction is directed to the protected region. Otherwise I/O instructions are permitted to be executed when such I/O instructions are not directed to a protected region of the mass storage device and when such I/O instructions are not write instructions.

BRIEF OF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 2:
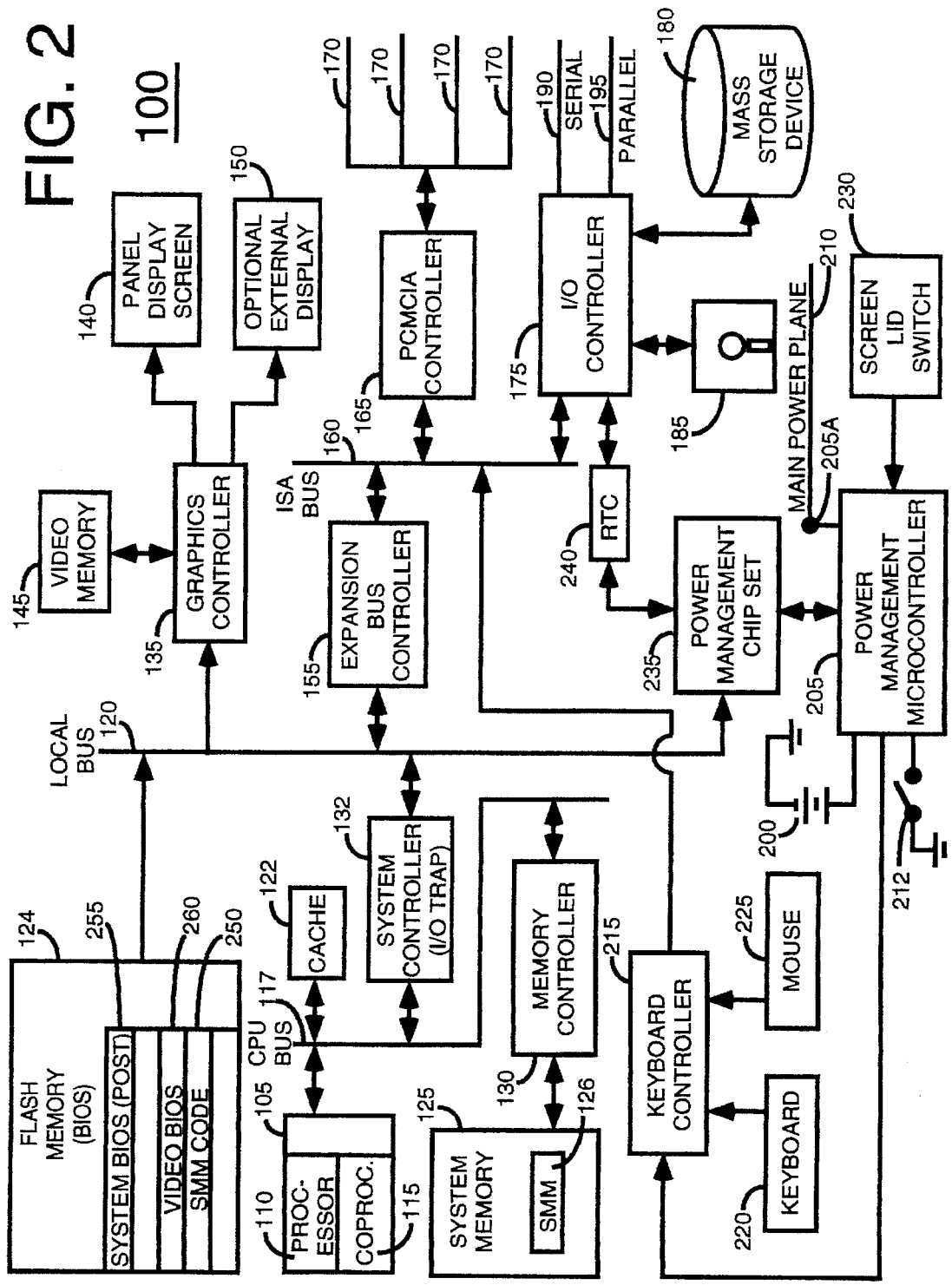
FIG. 2 is a block diagram of the disclosed computer system.

FIG. 2 is a block diagram of a computer system 100 which provides protection from unauthorized access to selected regions of a mass storage device 180. While this computer apparatus and protective methodology are described in terms of a portable computer which is powered by a battery 200, it should be understood that the protective methodology applies as well to other types of computers such as desktop and floor-standing computers, for example.

Before discussing the protective access aspects of computer system 100 in detail, the components of the computer system are first discussed in general. Computer system 100 includes a microprocessor 105 having a processor 110 for handling integer operations and a coprocessor 115 for handling floating point operations. Microprocessors which are suitable for use as microprocessor 105 include a system management mode (SMM). For example, the Intel 80486 microprocessor, the Intel Pentium® microprocessor, and the Intel Pentium Pro microprocessor include a system management mode and can be used as microprocessor 105.

Microprocessor 105 is coupled to a CPU bus 117. A cache memory 122 is also coupled to CPU bus 117 to provide caching of frequently used instructions and data. A main memory 125 of dynamic random access memory (DRAM) modules is coupled to CPU bus 117 by a memory controller 130. Main memory 125 includes a system management mode (SMM) memory area 126 which is employed to store software or code which implements the disclosed protective methodology as will be discussed in more detail subsequently.

A Basic Input Output System (BIOS) memory 124 is coupled to a local bus 120. A FLASH memory or other nonvolatile memory is used as BIOS memory 124. BIOS memory 124 stores the system microcode which controls the operation of computer 100. More particularly, BIOS KOM 124 stores code which implements the protective methodology prior to such code being transferred to the SMM memory area 126 for execution as later described.

A system controller 132 is coupled between CPU bus 117 and local bus 120 to interface processor 105 and CPU bus 117 to local bus 120. Examples of system controllers which can be employed as system controller 132 in computer system 100 are the Western Digital Model WD8110 chip set and the INTEL® Mobile Triton chip set. System controller 132 is employed to trap mass storage device I/O operations as will be discussed in more detail later.

A graphics controller 135 is coupled to local bus 120 and to a panel display screen 140. Graphics controller 135 is also coupled to a video memory 145 which stores information to be displayed on panel display 140. Panel display 140 is typically an active matrix or passive matrix liquid crystal display (LCD) although other display technologies may be used as well. Graphics controller 135 can also be coupled to an optional external display or standalone monitor display 150 as shown in FIG. 2. One graphics controller that can be employed as graphics controller 135 is the Western Digital WD90C24A graphics controller.

A bus interface controller or expansion bus controller 155 couples local bus 120 to an expansion bus 160. In this particular embodiment, expansion bus 160 is an Industry Standard Architecture (ISA) bus although other buses such as a Peripheral Component Interconnect (PCI) bus, for example, could also be used. A PCMCIA (Personal Computer Memory Card International Association) controller 165 is also coupled to expansion bus 160 as shown. PCMCIA controller 165 is coupled to a plurality of expansion slots 170 to receive PCMCIA expansion cards such as modems, fax cards, communications cards and other input/output devices.

Figure 1:
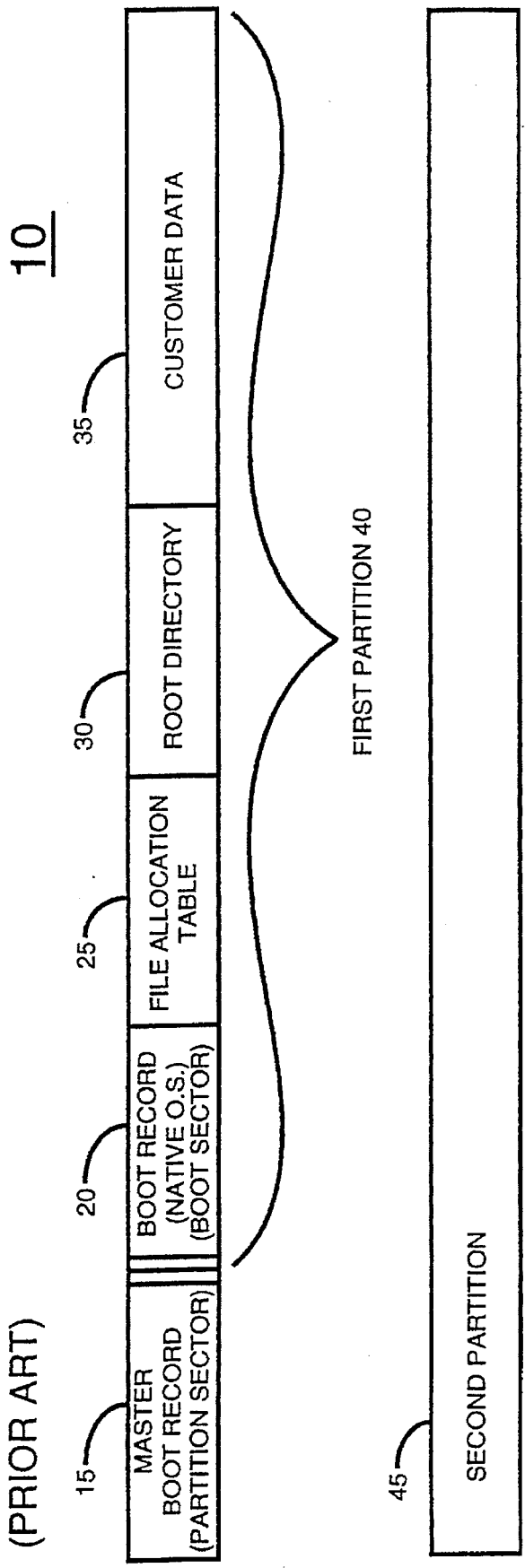
FIG. 1 is a representation of the partitioning arrangement of a typical conventional hard drive mass storage device in a personal computer system.

An I/O controller 175 referred to as a super I/O controller is coupled to ISA bus 160 as shown in FIG. 2. I/O controller 175 provides an interface between a mass storage device such as an integrated drive electronics (IDE) hard drive 180 and ISA expansion bus 160. I/O controller also provides an interface to floppy disk drive 185 or other storage media. In this particular example, hard drive 180 is a mass storage device which is partitioned and mapped in the manner described with reference to FIG. 1, although other disk drive partitioning and mapping could be employed as well. What is important here is that mass storage device 180 includes critical areas, such as a master boot record, a boot record for an operating system, a file allocation table and reserved operating system storage areas for which it is desirable to limit access. One purpose of limiting access is to prevent undesired tampering. I/O controller 175 also provides a serial port 190 and a parallel port 195 to which peripheral devices can be coupled.

Battery 200 provides power to the many devices which form computer system 100. Battery 200 is typically a rechargeable battery such as a nickel metal hydride (NiMH) or lithium ion battery, for example. Battery 200 is coupled to a power management microcontroller 205 which controls the distribution of power from battery 200. More specifically, microcontroller 205 includes a power output 205A coupled to the main power plane 210 which supplies power to microprocessor 105. Power microcontroller 205 is also coupled to a power plane (not shown) which supplies power to panel display 140. In this particular embodiment, power control microcontroller 205 is a Motorola 6805 microcontroller. Microcontroller 205 monitors the charge level of battery 200 to determine when to charge and when not to charge battery 200. Microcontroller 205 is coupled to a main power switch 212 which the user actuates to turn the computer on and off. While microcontroller 205 powers down other portions of computer system 100 such as hard drive 180 when not in use to conserve power, microcontroller 205 itself is always coupled to a source of energy, namely battery 200.

Power management microcontroller 205 is also coupled to a keyboard controller 215 which is coupled to ISA expansion bus 160. A keyboard 220 and mouse 225 are coupled to keyboard controller 215 so that user input can be provided to computer system 100. One microcontroller that can be used as keyboard controller 215 is the model 8051 microcontroller manufactured by Intel.

Portable computer system 100 includes a screen lid switch 230 or indicator 230 which provides an indication of when panel display 140 is in the open position and an indication of when panel display 140 is in the closed position. It is noted that panel display 140 is generally located in the same location in the lid of the computer as is typical for "clamshell" types of portable computers such as laptop or notebook computers. In this manner, the display screen forms an integral part of the lid of the computer which swings from an open position for interaction with the user to a close position.

Portable computer system 100 also includes a power management chip set 235 which includes power management chip models WD8110 and WD76C25 manufactured by Western Digital. Power management chip set 235 is coupled to microprocessor 105 via local bus 120 so that power management chip set 235 can receive power control commands from microprocessor 105. Power management chip set 235 is connected to a plurality of individual power planes which supply power to respective devices in computer 100 such as hard drive 180 and floppy drive 185, for example. In this manner, power management chip set 235 acts under the direction of microprocessor 105 to control the power to the various power planes and devices of the computer. A real time clock (RTC) 240 is coupled to I/O controller 175 and power management chip set 235 such that time events or alarms can be transmitted to power management chip set 235. Real time dock 240 can be programmed to generate an alarm signal at a predetermined time.

Figure 3:
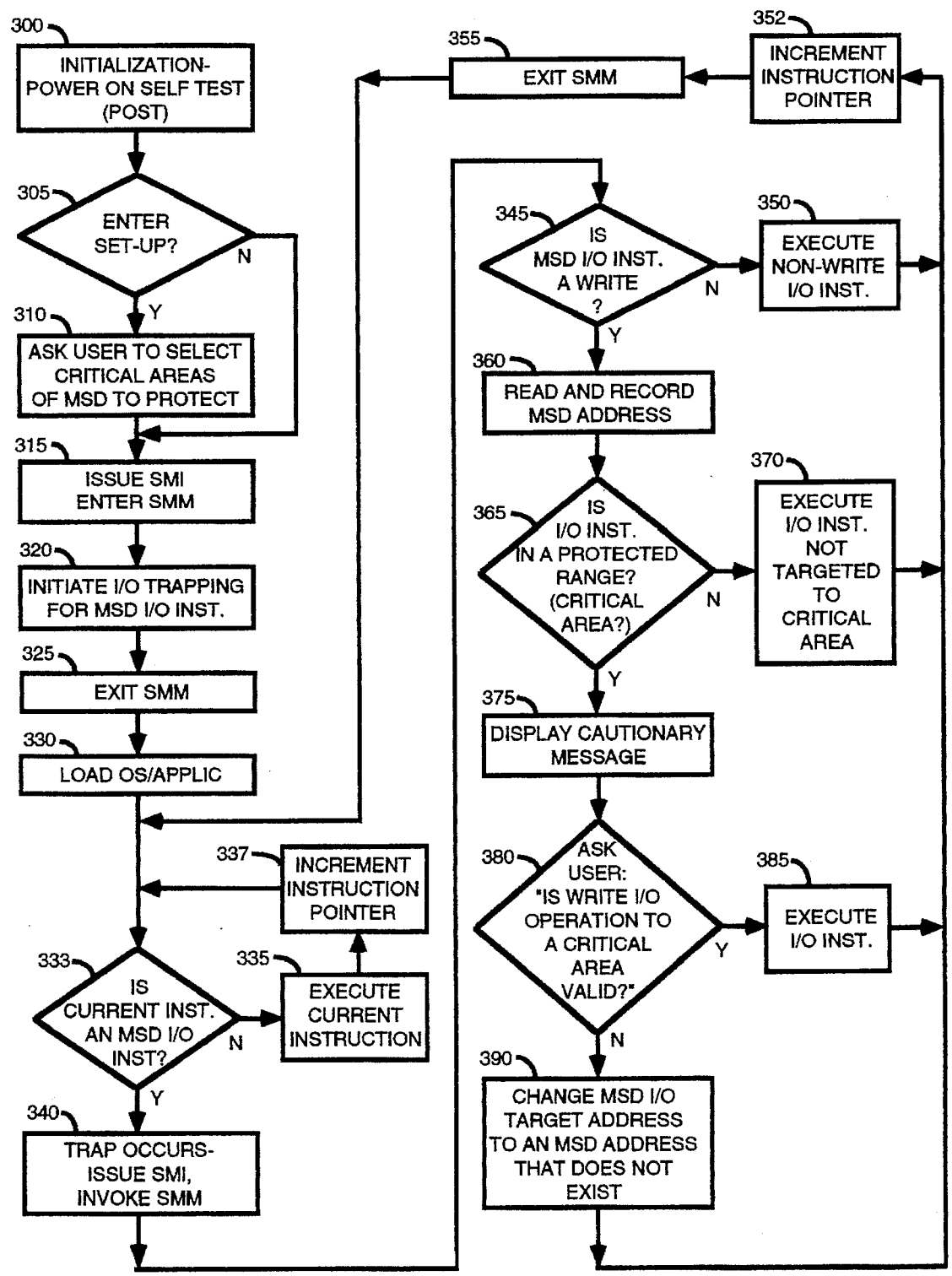
FIG. 3 is a flow chart depicting the process flow of mass storage device access limiting methodology employed in the computer system of FIG. 2.

The mass storage access protection achieved by the embodiment of the invention depicted in FIG. 2 is implemented in part by systems management mode (SMM) code 250 which is stored in BIOS memory 124. It is noted that along with SMM code 250, also stored in BIOS memory 124 are the system BIOS 255 (including a power on self test module-POST) and video BIOS 260. When computer 100 boots after being turned on, the sequence of events depicted in the flow chart of FIG. 3 is followed. This sequence of events is implemented by the SMM code software 250 which is executed by microprocessor 105 as now discussed in more detail.

When computer 100 is turned on, the system BIOS software stored in BIOS memory 124 is copied into system memory 125 so that it can be executed more quickly. This technique is referred to as "shadow RAM". At this time, SMM code 250 is copied into the system management mode memory area 126 of memory 125. SMM code 250 executes whenever microprocessor 105 receives a system management interrupt (SMI) which causes the microprocessor to enter system management mode (SMM). The conditions under which an SMI is generated are discussed subsequently.

Figure 4:
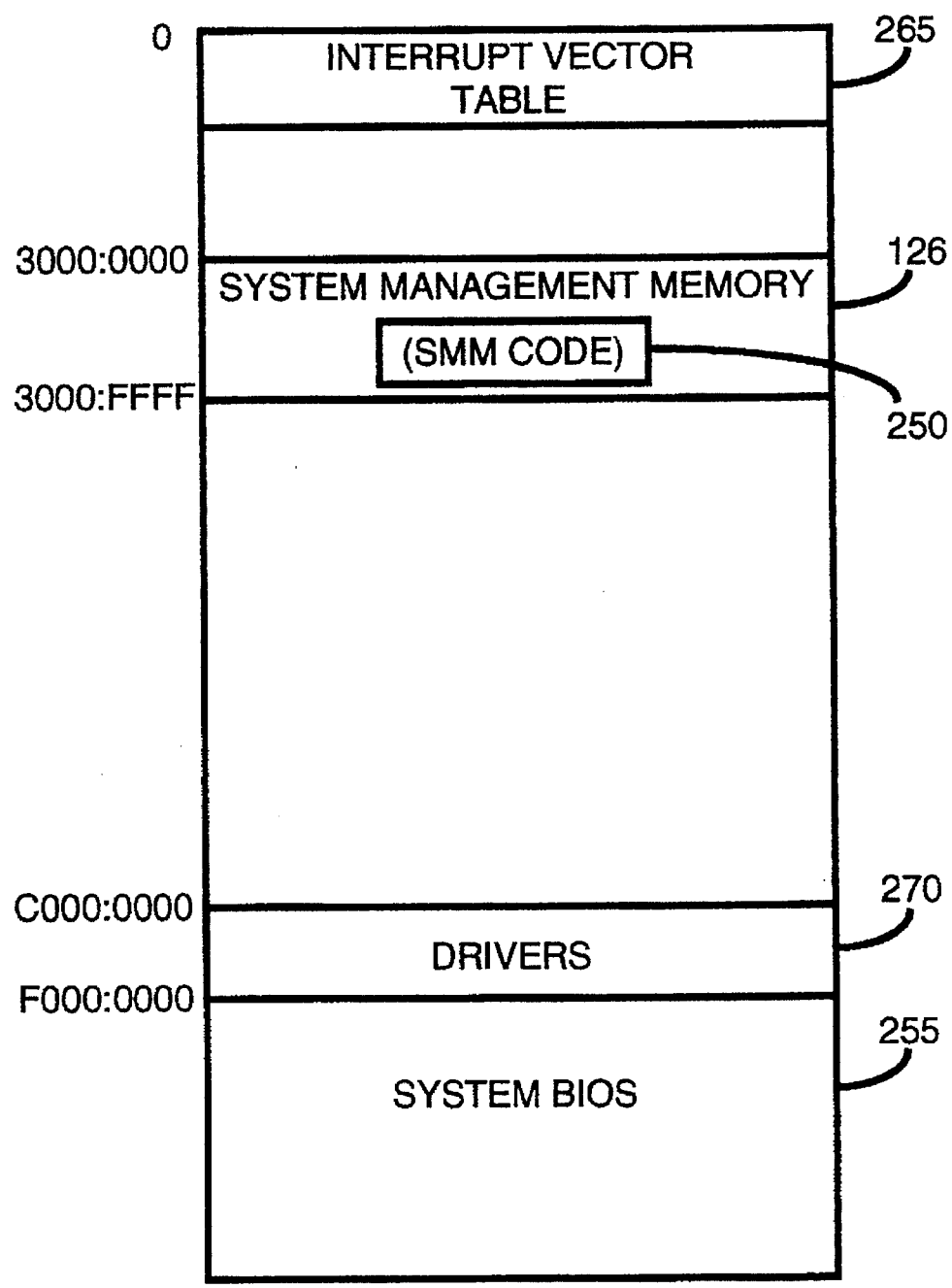
FIG. 4 is a memory map of the main memory of the computer system which illustrates the location of the system management mode (SMM) memory area.

In more detail, the system management mode (SMM) code 250 is stored in system management mode memory area 126 as shown in FIG. 4 In this particular embodiment, SMM memory area 126 resides between system memory addresses 3000:0000 and 3000:FFFF of system memory 125 whenever SMM is active. Also stored in system memory 125 are an interrupt vector table 265 which is part of the system BIOS, drivers 270, and the remainder of the system BIOS 255. Memory areas not otherwise designated in system memory 125 of FIG. 3 are available for the operating system and user application programs.

With the system BIOS 255 thus copied into system memory 125, the power-on-self-test module of BIOS executes to commence initialization of computer system 100 as per block 300 of the flowchart of FIG. 3. At this point the user can optionally enter a system set-up mode at block 305 by pressing a predetermined key combination or by using other preselected entry techniques. If the user elects to enter system set-up mode, then at input block 310 the user is asked to select those critical areas of the mass storage device 180 which should be protected. Critical areas such as master boot record 15, boot record 20, file allocation table 15 and other areas can be preselected for the user and optionally deselected by the user at this time if so desired. These critical areas correspond physically to respective address ranges on the mass storage device. Address range information corresponding to the selectable critical areas is provided to the computer system either at this time or earlier by predesignation. Critical areas of the mass storage device are alternatively referred to as critical regions.

At this point, a system management interrupt (SMI) is issued at block 315 thus causing computer system 100 to enter system management code and execute the protective code stored therein. This flowchart will serve to describe the methodology implemented by this protective code. More specifically, once system management mode is so entered at block 315, I/O trapping for read or write accesses to mass storage device (MSD) 180 is commenced at block 320. In other words, MSD I/O trapping commences at this point. System management mode (SMM) is exited at block 325.

The operating system and application software are loaded at block 330. In decision block 333 a determination is made to lind out if the current instruction from the operating system or application program is a mass storage device (MSD) I/O operation. If the current instruction is not an MSD I/O operation, then the instruction is executed at block 335. A program counter (not shown) or instruction pointer in the computer system is then advanced at block 337 to point to the next instruction to be executed. The next instruction, which is now the current instruction, is then inspected by decision block 333 to determine if such current instruction is an MSD I/O operation. When decision block 333 finds that the current instruction is an MSD I/O operation, a trap occurs at block 340. A system management interrupt (SMI) is issued and system management mode (SMM) is entered. The protective code in SMM memory area 126 is now executed. More particularly, a test is conducted at decision block 345 to determine if the trapped MSD I/O operation is a write operation. If the trapped MSD I/O operation is not a write (i.e. if it is merely a read operation or a status check operation, for example), then such non-write MSD I/O operation is allowed to continue and be executed at block 350. No danger is perceived for such a non-write operation. The instruction pointer is incremented at block 352 to point to the next instruction in the instruction stream which now becomes the current instruction. System management mode (SMM) is exited at block 355 and process flow continues back to decision block 333 where the new current instruction is tested as before.

However, if the MSD I/O instruction tested at decision block 345 is determined to be a write operation, then at block 360 the target address of the MSD I/O instruction is read and recorded for subsequent testing and use. A test is then conducted at decision block 365 to determine if the MSD I/O instruction is targeted at a mass storage device address within a protected range, i.e. to an address which corresponds to one of the aforementioned critical areas or other designated critical areas of mass storage device 180. If the target write address is found to not be within an address range corresponding to one of the selected critical MSD areas, then the requested write operation is allowed to continue and be executed as per block 370. No danger is perceived for such write operations to non-critical areas of the mass storage device. The instruction pointer is incremented at block 352 to point to a new current instruction and system management mode (SMM) is exited at block 355. Process flow continues back to block 333 where the new current instruction is tested.

However, if at decision block 365 the requested write operation is determined to be within an address range corresponding to a selected critical area of mass storage device 180, then a cautionary message is displayed to the user on display 140 as per block 375. For example, one such cautionary message is "DANGER! A PROGRAM IS TRYING TO WRITE TO YOUR PARTITION SECTOR. IS THIS WHAT YOU WANT TO DO?" In the above described cautionary block 375 which works together with decision block 380, the user is asked to indicate whether or not the proposed MSD write I/O operation to a critical area is valid. The user inputs a responsive answer to this inquiry into the computer system using keyboard 220, mouse 225 or other input device. If the user indicates that the write I/O operation to a critical area is valid and should be permitted, then the particular write I/O operation is allowed to continue and be executed as per block 385. Clearly, the user should indicate that a write operation to a critical area is to be permitted only when the user is absolutely sure that a destructive virus is not requesting such a write operation. Examples of situations wherein it may be desirable to permit a write operation to such a critical area are execution of the DOS FDISK program and execution of the MKS2D (Make Suspend To Disk) utility program which prepares mass storage device 180 for a suspend to disk operation. After the write operation is permitted to continue forward and be executed, the instruction pointer is incremented at block 352 to point to the new current instruction. System management mode (SMM) is exited at block 355 and process flow continues back to block 333 at which the new current instruction is tested.

However, if the user indicates in decision block 380 that the particular MSD write I/O operation to a critical area is not valid and is not to be permitted (as in the case when a virus is suspected), then in block 390 the protective SMM code causes the target address of the MSD write I/O operation to be changed to an address that doesn't exist. In other words, action is taken to assure that the requested write operation to the protected area of the mass storage device does not occur. After this prevention of an undesired write, the instruction pointer is incremented at block 352 to point to the new current instruction. System management mode (SMM) is exited at block 355 and process flow continues back to block 333 at which the new current instruction is tested.

Testing of each instruction in the instruction stream continues in this manner. In other words, the instructions of the application software and operating system which are provided to the processor for execution continue to execute and continue to be subjected to the above described protective testing mechanism. The computer system continues to trap MSD I/O operations and inspect such operations to determine if these operations are write operations directed to critically sensitive areas of the mass storage device or areas of the mass storage device which are otherwise designated as protected regions.

While the above described computer system traps all mass storage device I/O operations for a particular mass storage device, the trapping and inspection of I/O operations is more selective in other embodiments of the invention. In other words, whereas the above-described embodiment traps accesses to all addresses on the mass storage device, alternative embodiments are more selective in the types of I/O operations trapped and in the MSD address ranges for which trapping is sought.

For example, in another embodiment of the computer system 100, the computer system traps only MSD I/O write operations instead of trapping all MSD I/O operations. The protective SMM code is modified to achieve this selectivity. More particularly, the the flow chart of FIG. 3 is modified such that only write operations are trapped according to block 320 rather than all storage device accesses. Block 333 is modified such that it tests for write MSD I/O operations and in response to finding an MSD I/O operation, SMM is invoked at block 340. This is to be contrasted with testing for any MSD I/O operations (read, write or other) as was the case in the earlier described embodiment. In this alternative embodiment, block 345 and block 350 of the protective code described in the flow chart can be eliminated. Block 345 can be eliminated because this test to determine whether a particular access is a write is no longer necessary since the computer system is now trapping on writes.

In yet another embodiment, the protective code set forth in FIG. 3 is further modified to trap writes only to predetermined critical areas or address ranges of the mass storage device. In this manner, the computational overhead associated with the protective mechanism is significantly reduced. With this alternative embodiment, block 310 is modified such that the user is given the opportunity to select the critical areas of the mass storage device for which writes will be trapped. Blocks 333 and 340 are correspondingly modified to be more selective such that writes to the selected critical areas cause SMM to be invoked at block 340. In this embodiment, blocks 345, 350, 365 and 370 are eliminated. In this manner, when it is determined at decision block 333 and block 340 that a write has occurred to one of the selected critical areas of the mass storage device, the cautionary message of block 375 is displayed to the user. Process flow then continues as before with the user being given the opportunity at block 380 to verify that the particular write operation is permissible. If a particular MSD write I/O operation to a critical area is indicated as valid by the user, then that write I/O operation is permitted to be executed at block 385. Otherwise, the MSD I/O operation's target address in the critical area is changed to an address that doesn't exist at block 390 and the modified MSD I/O operation is then executed at block 385. In this manner, execution of the MSD write I/O operation to the original target address in the critical area is effectively prevented.

The instruction pointer is incremented at block 352 and SMM is exited at block 355. The inspection of subsequent current instructions continues.

Another use of the disclosed apparatus and methodology is to provide highly secure read-only protection to areas of a mass storage device other than the areas of the storage device which have been considered to be critical in the above discussion. For example, the address ranges associated with storage of particular applications and data can be designated as being protected by the same protective mechanism discussed above. In this manner, write I/O operations to the regions on disk where such designated applications and data are stored are prevented while read I/O operations to these regions are permitted.

While a computer system apparatus for limiting access to selected areas of a mass storage device is described above, it is clear that a methodology for achieving such limited access is also disclosed. More particularly, one embodiment of this method is practiced on a computer system including a processor configured to execute code in an operational mode and in a system management mode. The computer system includes a mass storage device and a memory coupled to the processor. The method includes the step of designating at least one region of the mass storage device as a protected region. The method also includes the step of trapping mass storage device I/O operations thus resulting in trapped mass storage device I/O operations. The method further includes the step of entering, by the processor, of the system management mode in response to the occurrence of a trapped mass storage device I/O operation. The method also includes the step of preventing execution of the trapped mass storage device I/O operation if the trapped mass storage device I/O operation is directed to a protected region of the mass storage device. The method further includes the step of continuing with execution of the trapped mass storage device I/O operation if the trapped mass storage device I/O operation is not directed to a protected region of the mass storage device.

The foregoing describes a computer system apparatus and methodology with the capability of protecting portions of the mass storage media from unauthorized access in a highly secure fashion. The mechanism employed to protect portions of the mass storage media is advantageously operating system independent. Thus, the protection mechanism functions regardless of what operating system is installed or what particular application software is presently being executed.

While only certain preferred features of the invention have been shown by way of illustration, many modifications and changes will occur. It is, therefore, to be understood that the present claims are intended to cover all such modifications and changes which fall within the true spirit of the invention.

I claim:

1. A computer system comprising:

a mass storage device for storing information, the mass storage device including a region which is designated as a protected region;

a processor, coupled to the mass storage device, the processor being configured to execute code in an operational mode and in a system management mode (SMM), the processor being configured to enter the system management mode when an I/O instruction is encountered which is directed to the mass storage device; and a memory, coupled to the processor, the memory including SMM code which when executed by the processor upon entering system management mode causes the processor to prevent a write I/O instruction directed to the protected region from writing to the protected region and otherwise permitting I/O instructions to be executed.

2. The computer system of claim 1 wherein a system controller is coupled to the processor for trapping I/O instructions which are directed to the mass storage device thus resulting in trapped I/O instructions for which the processor enters system management mode.

3. The computer system of claim 2 wherein the SMM code is configured to test the trapped instructions to determine if a trapped I/O instruction is a write instruction directed to a protected region of the mass storage device, the SMM code not permitting the trapped I/O instruction to be executed if the trapped I/O instruction is a write instruction directed to a protected region of the mass storage device and otherwise permitting execution of the trapped I/O instruction.

4. The computer system of claim 2 further comprising a user input device coupled to the processor for permitting the user to indicate whether a particular trapped I/O instruction directed to a protected region of the mass storage device is to be permitted to execute.

5. A computer system comprising:

a mass storage device for storing information, the mass storage device including a region which is designated as a protected region;

a processor, coupled to the mass storage device, the processor being configured to execute code in an operational mode and in a system management mode (SMM), the processor being configured to enter the system management mode when a write I/O instruction is encountered which is directed to the protected region of the mass storage device; and a memory, coupled to the processor, the memory including SMM code which when executed by the processor upon entering system management mode causes the processor to prevent a write I/O instruction directed to the protected region from writing to the protected region and otherwise permitting a write I/O instruction not directed to the protected region to be executed.

6. The computer system of claim 5 wherein a system controller is coupled to the processor for trapping write I/O instructions which are directed to the mass storage device thus resulting in trapped write I/O instructions for which the processor enters system management mode.

7. The computer system of claim 6 wherein the SMM code is configured to test the trapped write I/O instructions to determine if a trapped write I/O instruction directed to a protected region of the mass storage device, the SMM code not permitting the trapped write I/O instruction to be executed if the trapped write I/O instruction directed to a protected region of the mass storage device and otherwise permitting execution of the trapped I/O instruction if the trapped write I/O instruction is not directed to a protected region of the mass storage device.

8. The computer system of claim 6 further comprising a user input device coupled to the processor for permitting the user to indicate whether a particular trapped write I/O instruction directed to a protected region of the mass storage device is to be permitted to execute.

9. A method of operating a computer system including a processor configured to execute code in an operational mode and in a system management mode, a mass storage device and a memory being coupled to the processor, the method comprising the steps of:

designating at least one region of the mass storage device as a protected region;

trapping mass storage device I/O operations thus resulting in trapped mass storage device I/O operations;

entering, by the processor, of the system management mode in response to the occurrence of a trapped mass storage device I/O operation;

preventing execution of the trapped mass storage device I/O operation if the trapped mass storage device I/O operation is directed to a protected region of the mass storage device; and continuing with execution of the trapped mass storage device I/O operation if the trapped mass storage device I/O operation is not directed to a protected region of the mass storage device.

10. The method of operating a computer system of claim 9 further comprising the step of loading an operating system prior to the trapping step.

11. The method of operating a computer system of claim 10 further comprising the step of loading an application program after loading the operating system.

12. The method operating a computer system of claim 9 wherein the trapping step comprises testing a current instruction in an instruction stream provided to the processor to determine if the current instruction is a mass storage device I/O operation and in response issuing a system management interrupt if the current instruction is a mass storage device I/O operation.

13. The method of operating a computer system of claim 12 further comprising the step of the processor entering system management mode in response to a system management interrupt.

14. The method of operating a computer system of claim 13 further comprising the step of testing the current instruction to determine if an I/O operation associated with the current instruction is a mass storage device I/O operation, and if so, further testing the current instruction to determine if the I/O operation associated therewith is a write to a protected region of the mass storage device.

15. The method of operating a computer system of claim 14 further comprising the step of executing the current instruction if the I/O operation associated with the current instruction is found not to be a write operation.

16. The method of operating a computer system of claim 14 further comprising the step of executing the current instruction if the I/O operation associated with the current instructions is found to be a write operation which is not directed to a protected region of the mass storage device.

17. The method of operating a computer system of claim 14 further comprising the step of preventing a write I/O operation directed to a protected region of the mass storage device when the current instruction is found to be a write I/O operation which is directed to a protected region of the mass storage device.

18. The method of operating a computer system of claim 14 further comprising the step of outputting a question to the user asking if it is acceptable to continue execution of the current instruction when the current instruction is a write I/O operation to a protected region of the mass storage device.

19. The method of operating a computer system of claim 18 further comprising the step of executing the current instruction when the user indicates that it is acceptable to execute the current instruction.

20. The method of operating a computer system of claim 18 further comprising the step of preventing execution of the current instruction when the user indicates that it is not acceptable to execute the current instruction.

21. A method of operating a computer system including a processor configured to execute code in an operational mode and in a system management mode, a mass storage device and a memory being coupled to the processor, the method comprising the steps of:

designating at least one region of the mass storage device as a protected region;

trapping a mass storage device write I/O operation targeted at a protected region of the mass storage device thus resulting in a trapped write I/O operation; and entering system management mode and executing system management mode code for preventing the trapped write I/O operation from writing to the protected region.

22. A method of operating a computer system including a processor configured to execute code in an operational mode and in a system management mode, a mass storage device and a memory being coupled to the processor, the method comprising the steps of:

designating at least one region of the mass storage device as a protected region;

trapping mass storage device I/O operations thus resulting in trapped mass storage device I/O operations;

entering, by the processor, of the system management mode in response to the occurrence of a trapped mass storage device I/O operation;

determining if the trapped mass storage device I/O operation is a write I/O operation directed to a protected region of the mass storage device, and if so, requesting user input to indicate if the write I/O operation to the protected region should be permitted or not permitted;

preventing the write I/O operation from writing to the protected region if user input so indicates; and permitting the write I/O operation to write to the protected region if user input so indicates.

23. The method of operating a computer system of claim 22 further comprising the step of permitting the trapped mass storage device I/O operation to execute if the trapped mass storage device I/O operation is not a write operation.

24. The method of operating a computer system of claim 22 further comprising the step of permitting the trapped mass storage device I/O operation to execute if the trapped mass storage device I/O operation is a write operation which is not directed to a protected region of the mass storage device.

* * * * *